United States Patent [19]

Nomura et al.

[11] 4,347,826

[45] Sep. 7, 1982

[54] FUEL EVAPORATOR FOR INTERNAL COMBUSTION ENGINE

[75] Inventors: Ken Nomura, Okazaki; Toshihiko Igashira, Toyokawa; Seikou Abe, Kariya, all of Japan

[73] Assignee: Nippon Soken, Inc., Nishio, Japan

[21] Appl. No.: 202,173

[22] Filed: Oct. 29, 1980

[30] Foreign Application Priority Data

Oct. 31, 1979 [JP] Japan .................. 54-150836[U]

[51] Int. Cl.³ .................................... F02M 31/00
[52] U.S. Cl. .................................... 123/549; 123/548; 261/142
[58] Field of Search .............. 123/552, 548, 549, 547; 261/142; 219/206, 207

[56] References Cited

U.S. PATENT DOCUMENTS

| | | | |
|---|---|---|---|
| 3,886,918 | 6/1975 | Cole | 123/548 |
| 3,898,422 | 8/1975 | Fuller | 123/549 |
| 3,987,772 | 10/1976 | McBride | 123/549 |
| 4,108,125 | 8/1978 | Marcoux | 123/549 |
| 4,177,778 | 12/1979 | Naitou | 123/549 |
| 4,242,999 | 1/1981 | Hoser | 123/548 |
| 4,246,880 | 1/1981 | Henke | 123/548 |
| 4,279,234 | 7/1981 | Marcoux | 123/549 |
| 4,303,050 | 12/1981 | Platzer | 123/549 |

Primary Examiner—Ronald H. Lazarus
Attorney, Agent, or Firm—Cushman, Darby & Cushman

[57] ABSTRACT

A fuel evaporator for an internal combustion engine comprises a casing composed of a heating plate member, a supporting member projecting from the outer periphery of the heating plate member underwards and a heat resistant and electric insulating covering member which covers the supporting member, a heating element can be fixed to the heating plate member within the casing and an electrically connecting means which connects the heating element and an electric power source. The fuel evaporator further comprises an elastic cushion member which is disposed in the under surface of the heating element and a spring means which supports and presses the heating element against the heating plate member of the casing through the cushion member. Due to the elasticity of the cushion member, the heating element is uniformly pressed by the spring means without being broken.

13 Claims, 4 Drawing Figures

FUEL EVAPORATOR FOR INTERNAL COMBUSTION ENGINE

BACKGROUND OF THE PRESENT INVENTION

The present invention relates to a fuel evaporator to be installed in an intake manifold of an internal combustion engine, which comprises a heating element made of ceramic material having positive temperature coefficient of resistance, particularly to a supporting structure for the heating element of the fuel evaporator.

Ceramic material such as barium titanate (hereinafter will be called PTC ceramic) has such characteristics that when electrified, it generates heat and when the temperature thereof reaches a specific value (called Curie temperature), the electric resistance thereof increases rapidly. Under the Curie temperature, the PTC ceramic receives a large amount of electric current to reach the Curie temperature rapidly. Over the Curie temperature, the electric resistance becomes remarkably large and the PTC ceramic receives only a small amount of electric current, so that the PTC ceramic is not overheated. Thus, the PTC ceramic adjusts the temperature thereof by itself into about the Curie temperature.

Therefore, by using the PTC ceramic as the heating element for promoting the evaporation of the fuel contained within the intake mixture supplied into the internal combustion engine, the intake mixture can be heated at a moment even at a cold starting time.

Thus, according to this device, the fuel within the intake mixture can be effectively evaporated compared with other heating means such as exhaust gas and engine coolant.

In the conventional fuel evaporator using the PTC ceramic as a heating element, a casing made of a heat conductive metallic plate is disposed in one portion of the intake manifold directly under the throttle valve. And one portion of the casing is exposed to the interior of the intake manifold. Within the casing, the heating element is closely fixed to the under surface of the exposed portion of the casing.

One of the problems of the above described conventional fuel evaporator is that heat generated by the heating element escapes to the wall of the intake manifold through the metallic casing to lower the heating efficiency.

In order to overcome the above described problems, we, inventors have proposed the structure that the side wall of the casing is covered with the electric insulating material such as synthetic resin and that the casing is fixed to the wall of the intake manifold through the cover member. (Japanese Utility Model Applications No. 113959/1979 and No. 64721/1980, which are the priority cases for our copending application Ser. No. 177,799 filed Aug. 13, 1980.)

Another problem of the above described conventional fuel evaporator is that it is very difficult to closely fix the fragile heating element made of ceramic to the casing without being broken.

In general, the heating element is closely fixed to the casing by means of a wave member, a coil spring or the like.

However, since the wave washer does not spring so largely so as to compensate the vibration of the device, the load applied to the heating element becomes ununiform. Consequently, the heating element is in danger of slipping relative to the casing.

And when the coil spring is used, particularly higher load is applied to the connecting portions of the heating element with the coil spring, compared with the other portions thereof.

As a result, the heating element is in danger of being broken.

In order to make the pressing force of the coil spring applied to the heating element uniform, a metallic plate can be interposed between the heating element and the coil spring.

However, in this case, it is very difficult to machine the opposed surfaces of the metallic plate and the heating element so as to completely fit to each other.

When the load of the coil spring is applied to the portion of the metallic plate with which the heating element is partially contacted, the heating element is apt to be broken in the portion.

Accordingly, one object of the present invention is to provide a fuel evaporator comprising a heating element made of PTC ceramic, and having high heating efficiency and excellent durability.

Another object of the present invention is to provide a supporting structure for uniformly and closely fixing the heating element made of PTC ceramic to the fuel evaporator without being broken.

Other objects and advantages of the invention will become apparent from the following description of embodiments with reference to the accompanying drawings wherein.

SUMMARY OF THE INVENTION

A fuel evaporator for an internal combustion engine of the present invention comprises a casing composed of a heating plate member, a supporting member projecting from the outer periphery of the heating plate member underwards and a heat resistant and electric insulating covering member which covers the supporting member, a heating element made of a ceramic having positive temperature coefficient of resistance, which is fixed to the heating plate member within the casing and an electrically connecting means which connects the heating element and an electric power source. The fuel evaporator further comprises an elastic cushion member which is disposed in the under surface of the heating element and a spring member which supports and presses the heating element against the heating plate member of the casing through the cushion member.

According to the present invention, the load applied to the heating element by the spring member such as the coil spring can be made uniform due to the elasticity of the metallic wire fabric forming the cushion member.

And since the cushion member is formed of the heat resistant metallic fine wire, the elasticity thereof is scarcely lowered even under the influence of the heat generated in the heating element.

DETAILED DESCRIPTION OF THE INVENTION

Hereinafter, the embodiments of the present invention will be explained with reference to the drawings.

Figure 1:
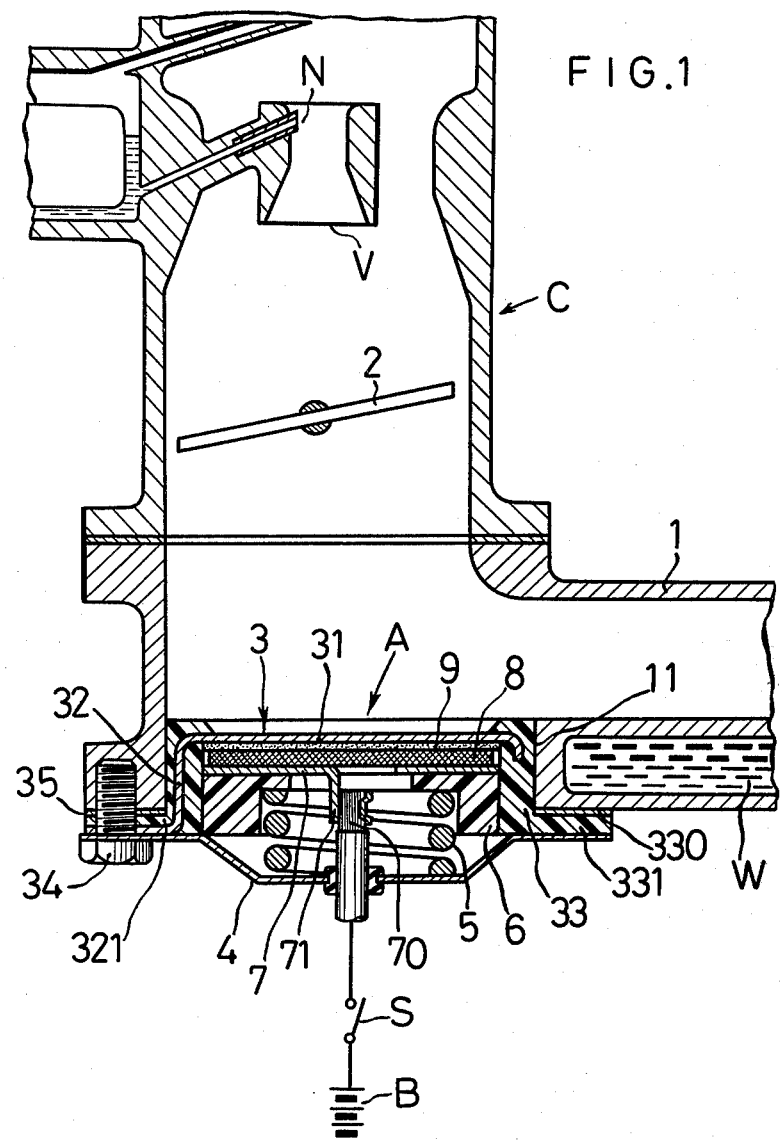
FIG. 1 is a longitudinal sectional view of a fuel evaporator of a first embodiment of the present invention.

In FIG. 1, a carburetor C is disposed in the upper stream of an intake manifold 1 of an internal combustion engine. The gasoline fuel which is supplied from a fuel nozzle N which opens in a venturi portion V is mixed with the intake air and is supplied to a combustion chamber (not shown) of the engine by way of the intake manifold 1 through a throttle valve 2.

In a wall of a bent portion of the intake manifold 1 forming a heat riser portion, directly under the throttle valve T, a circular hole 11 is formed. And a fuel evaporating device A is disposed therein.

A casing 3 of the device A is composed of a circular plate-shaped heating plate portion 31, a plurality of leg-shaped supporting portions 32 which project underwards from the periphery of the heating plate portion 31 in a direction perpendicular thereto, a flange portion 321 which projects from the lower end of each of the supporting portions 32 outerwards, and a cylindrical covering portion 33 which covers the supporting portions 32 to form a side wall of the casing 3.

In an end of the covering member 33, a flange portion 331 is formed.

The heating plate portion 31 and the supporting portions 32 are integrally formed of an aluminum plate. And the covering portion 33 is formed of heat resistant and electric insulating synthetic resin.

The covering portion 33 is closely inserted within the hole 11 formed in the intake manifold 1. And the under opening of the hole 11 is covered by a metallic bottom plate 4.

The flange portion 331 of the covering portion 33 is secured to the intake manifold 1 by means of bolts 34 together with the bottom plate 4 in such positions that the flange portions 321 of the supporting portions 32 are covered thereby.

And between the flange portion 331 of the covering portion 33 and the intake manifold 1, a gasket 330 is interposed.

Within the casing 3, a coil spring 5 is supported on the bottom plate 4. The coil spring 5 supports the heating element 9 through an electric insulating member 6, an electrode plate 7 and a cushion member 6. And the coil spring 5 presses the heating element 9 against the under surface of the heating plate portion 31 by spring force thereof.

The electric insulating member 6 is made of synthetic resin and shaped into a cylindrical body provided with a flange portion projecting from the upper end thereof inwards.

The electrode plate 7 is formed of a copper plate. The central portion thereof is cut and bent downwards to form an electrode terminal 71. The electrode terminal 71 is connected to a battery B through a lead wire 70 and a key switch S.

The cushion member 8 is made of stainless steel wool which is produced by knitting fine stainless steel wire and is formed into a circular plate shape.

The heating element 9 is formed of a sintered body containing barium titanate as a main ingredient into a circular plate shape.

And within the wall of the intake manifold 1, a passage W is formed adjacent to the fuel evaporator for circulating the engine coolant.

When the internal combustion engine is started by closing the key switch, the electric current supplied from the battery flows in the order of the battery anode, the lead wire 70, the electrode plate 7, the cushion member 8, the heating element 9, the heating plate portion 31 of the casing 3, the supporting portions 32, the flange portions 321, the bolts 34, the intake manifold 1, and the battery cathode.

At this time, the temperature of the heating element 9 rises up to about 150° C. instantaneously. And the heat is transmitted from the heating element 9 to the heating plate portion 31.

At a cold starting time, the unevaporated fuel droplets flowing within the intake manifold 1 are contacted with the heated heating plate portion 31 to be evaporated.

According to the present invention, by interposing the cushion member 8 between the heating element 9 and the coil spring 5, the pressing force is uniformly applied to the heating element due to the elasticity of the cushion member 8.

And the whole opposed surfaces of the heating element 9 and the cushion member 8, and those of the heating element 9 and the heating plate portion can be closely fixed to each other with uniform.

In particular, the cushion member formed of stainless steel wool is very favorable since the elasticity thereof is hardly lost even if the cushion member is directly contacted with the heating element 9 of which temperature is high.

Figure 2:
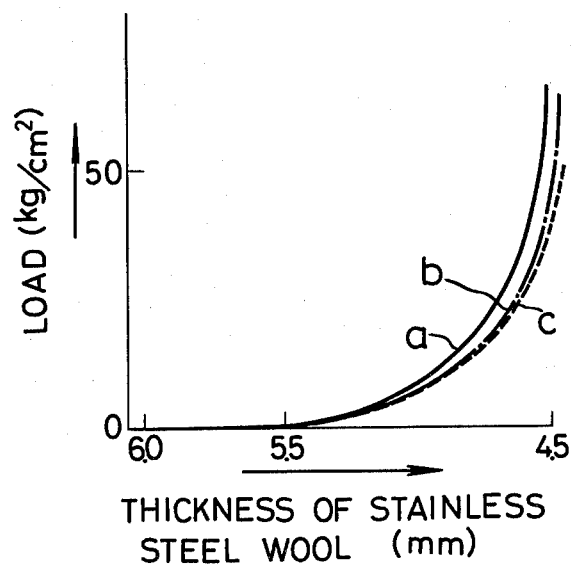
FIG. 2 is a load-deformation diagram of the stainless steel wool.

FIG. 2 shows a load-deformation diagram of stainless steel wool of 6 mm in thickness and 1.69 g/cm$^3$ in density in an atmosphere at 200° C.

In FIG. 2, line b shows a result after the load of 10 kg was applied for 10 hours, line c shows a result after the load of 10 kg was applied for 100 hours, and line a shows a result when no load was applied beforehand.

As is known from the experimental result, the stainless steel wool hardly loses the characteristic thereof even after the load was applied thereto for a long time. Though a little shrinkage was observed, such shrinkage can be sufficiently compensated by the stroke of the coil spring 5.

Therefore, even after a long time, the heating element 9 remains closely fixed to the heating plate portion 31.

Figure 3:
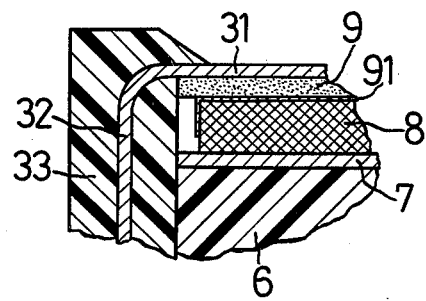
FIG. 3 and FIG. 4 are partially cut away longitudinal cross sections of the fuel evaporators of other embodiment of the present invention respectively.

FIG. 3 shows another embodiment of the present invention.

In FIG. 3, a very thin saucer-shaped metallic plate 91 made of soft material, for example an aluminun thin plate of 0.1~0.3 mm in thickness, is interposed between the cushion member 8 made of stainless steel wool and the heating element 9.

When the soft and thin metallic plate 91 is interposed, the contact resistance between the cushion member 8 and the heating element 9 is hardly increased.

And since the outer periphery of the stainless steel wool of the cushion member 8 is surrounded by the metallic plate 91, the stainless steel wool fine wire can be prevented from deforming and projecting outwards. Therefore, even if there is a small space between the outer peripheral surface of the heating element 9 and the inner peripheral surface of the covering portion 33, the projecting stainless steel wool fine wire can be prevented from being directly connected with the heating plate portion 31 through the gap. And the heating element and the stainless steel wool are not short-circuited.

Figure 4:
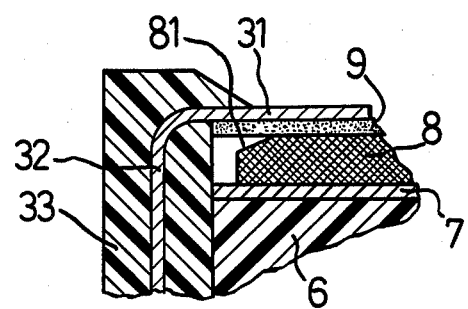

FIG. 4 shows a still another embodiment of the present invention.

In FIG. 4, a taper portion 81 is formed in the upper corner portion of the cushion member 8. According to the structure of this embodiment, the projecting stainless steel wool fine wire can be prevented from being short-circuited with the heating element 9.

As described above, according to the present invention, between the heating element which is disposed within the metallic casing of the fuel evaporator and the spring member for supporting and pressing the heating element against the inner surface of the casing, the cushion member formed electric conductive metallic fine wire fabric such as stainless steel wool is interposed.

According to the present invention, the shock against the heating element can be absorbed by the cushion member and the pressing load of the spring member can be uniformly applied to the heating element.

Therefore, the heating element can be prevented from being broken and the performance of the heating element is not lowered.

And since a sufficiently large pressing force is uniformly applied to the heating element due to the elasticity of the cushion member, the contact resistance between the heating element and the cushion member is not largely lowered so that the applied electric current can be effectively used for heating the heating element.

Furthermore, by making the cushion member of the metallic fine wire fabric such as stainless steel wool, the elasticity of the cushion member is not lowered even if the metallic fine wire fabric is directly contacted with the heating element.

In the above described embodiments, a coil spring was used as the spring member. Other spring member such as a wave washer can be also used, if it supports and presses the heating element due to the spring action thereof.

Having now fully described the invention, it will be apparent to one of ordinary skill in the art that many changes and modifications can be made thereto without departing from the spirit or scope of the invention as set forth herein.

What is claimed is:

1. A fuel evaporator disposed in an intake manifold of an internal combustion engine, comprising:
    a casing composed of
        a metallic heating plate member;
        a metallic supporting member which projects from the outer periphery of said heating plate member underwards;
        a covering member made of heat resistant and electric insulating material, which covers the outer periphery of said supporting member; and
        a bottom plate member which covers an opening formed by the lower ends of said supporting member and said covering member;
        said covering member being closely inserted within a hole penetrating through said intake manifold so that said heating plate member is exposed to the interior of said intake manifold;
    a heating element composed of a ceramic having positive temperature coefficient of resistance, which is closely fixed to the under surface of said heating plate member within said casing;
    a cushion member composed of metallic fine wire fabric, which is closely fixed to the under surface of said heating element;
    a spring member which is disposed on said bottom plate member within said casing so as to support said heating element through said cushion member and press said heating element against said heating plate portion; and
    an electrically connecting means which electrically connects said heating element and an electric power source.

2. A fuel evaporator according to claim 1, wherein:
said heating element is formed of sintered semiconductive barium titanate.

3. A fuel evaporator according to claim 1, wherein:
said heating plate member and said supporting member are integrally formed.

4. A fuel evaporator according to claim 1, wherein:
said heating plate member has a circular plate shape; and
said covering member has a cylindrical shape.

5. A fuel evaporator according to claim 4, wherein:
said cushion member is formed into a circular plate shape so as to have a slightly smaller diameter than said heating plate member; and
said cushion member and said heating plate member are coaxially disposed.

6. A fuel evaporator according to claim 5, further comprising:
a thin saucer-shaped metallic plate which is interposed between said heating element and said cushion member so as to cover the upper portion of the outer periphery of said cushion member.

7. A fuel evaporator according to claim 5, wherein:
the upper peripheral corner portion of said cushion member is formed into a tapered shape so that the diameter thereof is increased in the direction opposite to said heating plate member.

8. A fuel evaporator according to claim 4, wherein:
said covering member and said supporting member are provided with an outwards directing flange portion in the lower end thereof respectively to be fixed to the outer wall of said intake manifold.

9. A fuel evaporator according to claim 8, wherein:
said supporting member is composed of a plurality of legs projecting underwards from said heating plate portion in the perpendicular direction.

10. A fuel evaporator according to claim 1, wherein:
said electrically connecting means comprises
    an electrode plate which is fixed to the under surface of said cushion member;
    an electric power source;
    a switching means; and
    a lead wire which connects said electrode plate and said electric power source through said switching means.

11. A fuel evaporator according to claim 1, wherein:
said covering member is formed of synthetic resin.

12. A fuel evaporator according to claim 1, wherein:
said cushion member is formed of stainless steel wool produced by knitting fine stainless steel wire.

13. A fuel evaporator according to claim 1, wherein:
said spring member is composed of a coil spring which is supported by said bottom plate.

* * * * *